(No Model.) 3 Sheets—Sheet 1.
E. THOMSON & E. W. RICE, JR.
ELECTRIC MOTOR FOR STREET CARS.
No. 457,036. Patented Aug. 4, 1891.
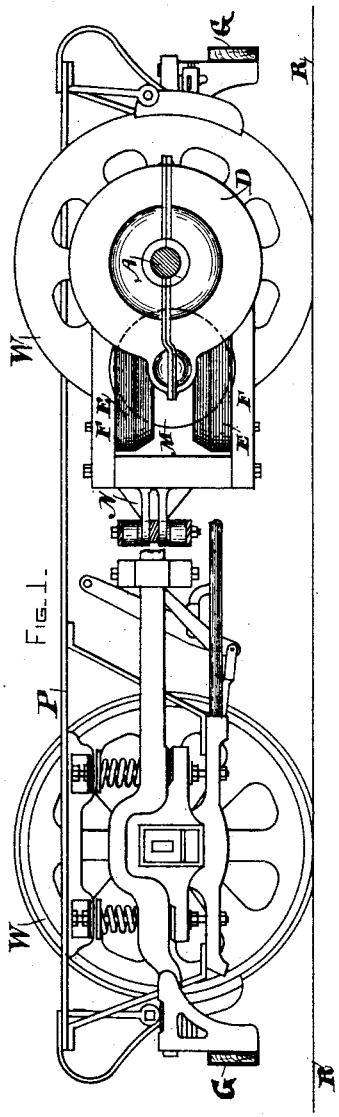
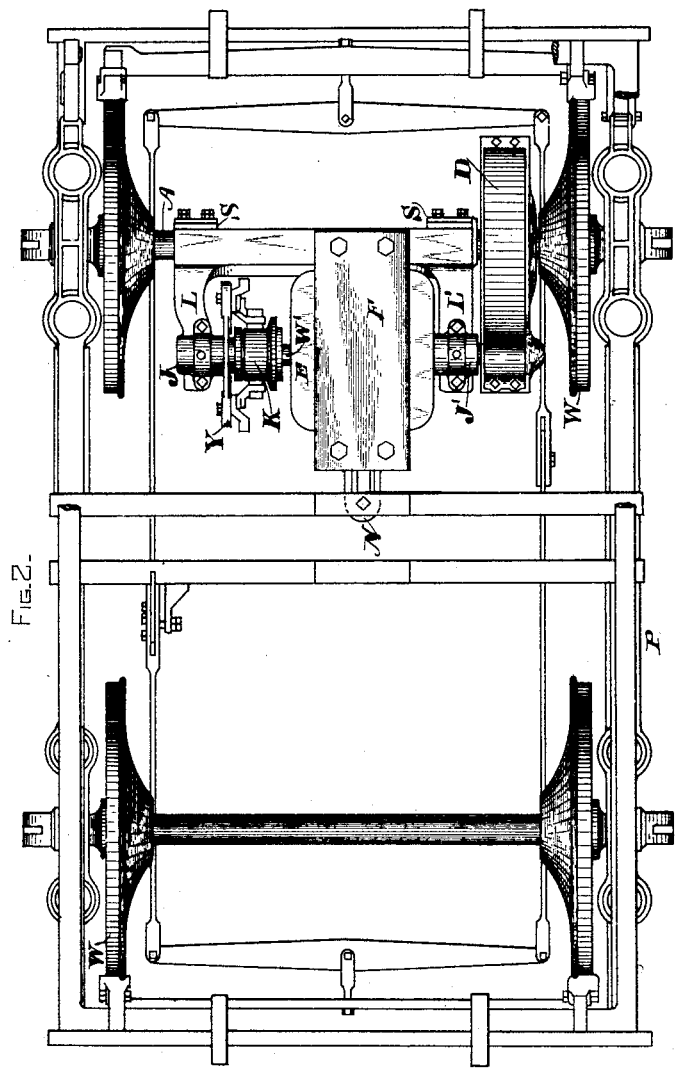

(No Model.)  3 Sheets—Sheet 2.

E. THOMSON & E. W. RICE, JR.
ELECTRIC MOTOR FOR STREET CARS.

No. 457,036. Patented Aug. 4, 1891.

WITNESSES  
INVENTORS (No Model.) 3 Sheets—Sheet 3.

E. THOMSON & E. W. RICE, JR.
ELECTRIC MOTOR FOR STREET CARS.

No. 457,036. Patented Aug. 4, 1891.

WITNESSES
A. F. Macdonald
John W. Gibboney

INVENTORS
Elihu Thomson
Edwin W. Rice Jr
by Bentley & Knight
Attys

THE NORRIS PETERS CO., PHOTO-LITHO., WASHINGTON, D. C.

UNITED STATES PATENT OFFICE.

ELIHU THOMSON, OF SWAMPSCOTT, AND EDWIN WILBUR RICE, JR., OF LYNN, MASSACHUSETTS.

ELECTRIC MOTOR FOR STREET-CARS.

SPECIFICATION forming part of Letters Patent No. 457,036, dated August 4, 1891.

Application filed January 19, 1891. Serial No. 378,246. (No model.)

*To all whom it may concern:*

Be it known that we, ELIHU THOMSON, a citizen of the United States, residing at Swampscott, in the county of Essex, State of Massachusetts, and EDWIN WILBUR RICE, Jr., a citizen of the United States, residing at Lynn, in the county of Essex and State of Massachusetts, have invented a certain new and useful Improvement in Electric Motors for Street-Cars, of which the following is a specification.

The present invention relates to an electric motor particularly well adapted for the propulsion of street-cars or other vehicles, and when so used it is mounted upon the truck of the vehicle in accordance with the ordinary practice and geared so that the rotary motion of the armature is imparted to the driven wheels.

The improvements comprise certain novel features of construction, which will be pointed out and claimed farther on, and our aim has been to secure a motor of maximum torque, which will work efficiently at a comparatively slow rate of speed, thereby necessitating only a single set of reduction-gears between armature and axle, a feature which results in rendering the motor practically noiseless and reduces materially the repair-bill upon motor and gearing.

While securing the above-named advantages our improved motor also is so designed as to accommodate itself to the limited space beneath the body of a street-car and to secure protection so far as possible to the field-coils and armature.

Reference will now be made to the accompanying drawings, wherein—

Figure 3:
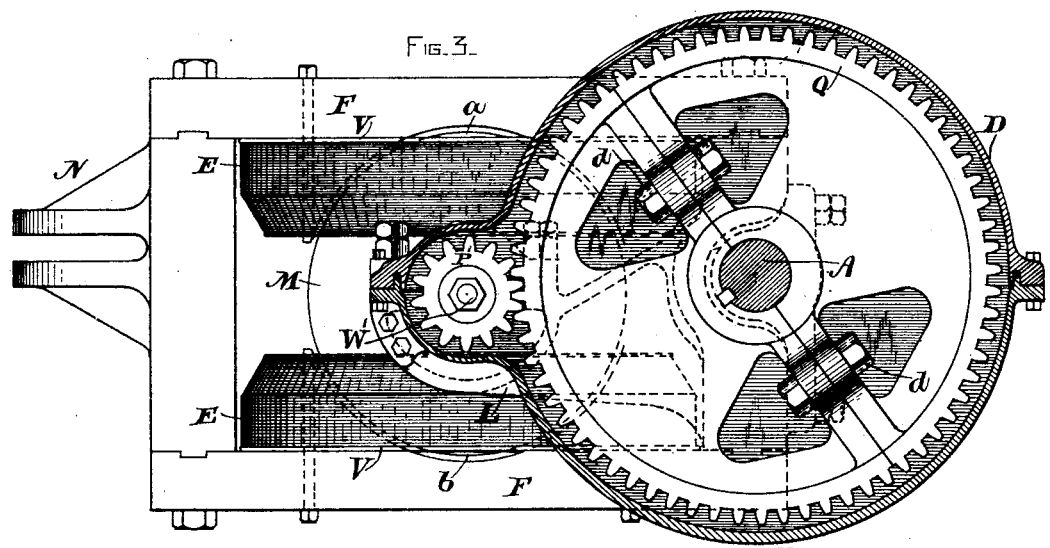
Figure 4:
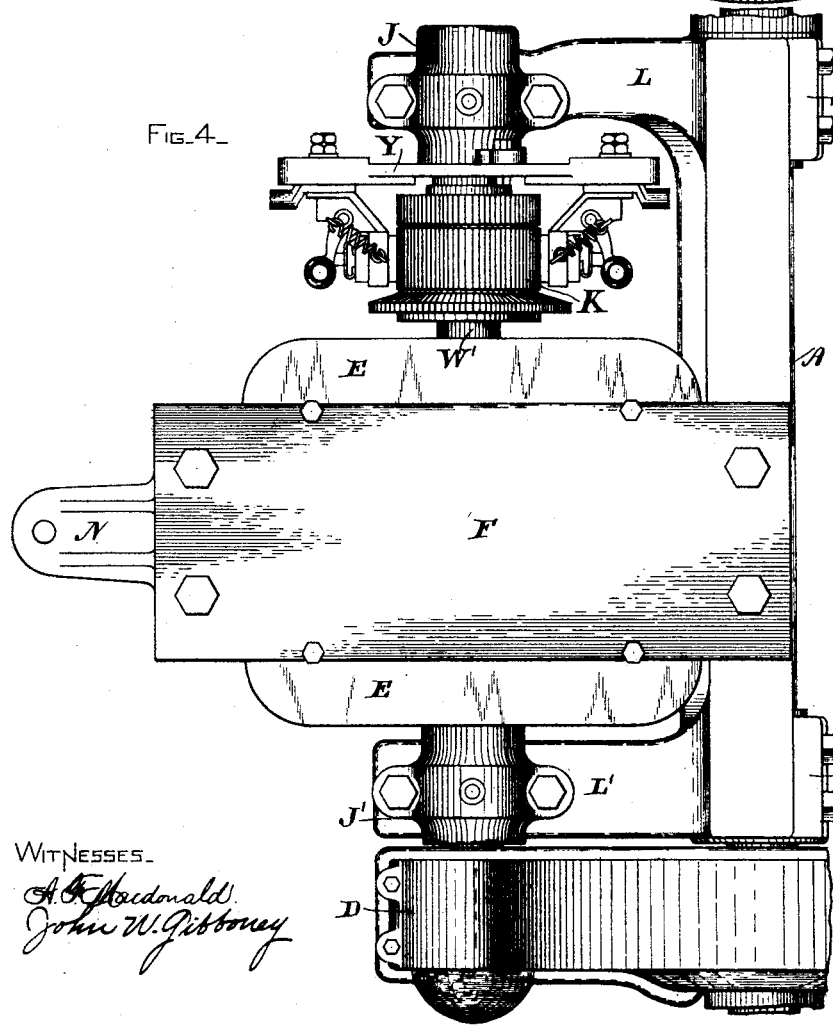

Figure 1 is a view, partly in side elevation and partly in section, of a truck with one of our improved motors. Fig. 2 is a plan view of the same. Figs. 3 and 4 are enlarged side and plan views of the motor itself. Figs. 5, 6, 7, and 8 illustrate in detail certain features in the construction of the motor; and Fig. 9 is a perspective view of the motor as boxed in.

In Fig. 1, W W are the wheels of a street-car or other truck running on a track R and driven by an electric motor applied to one or both axles of the truck, as the case may be. The truck-frame P is of standard construction now well known in this art, as are also the guard-boards G G, the brakes, brake-gear, and in fact all parts shown, except so far as relates to the driving-motor itself. As these details of the truck construction form no part of the present invention, we are not in anywise limited thereby in applications which may be made of the motor.

Proceeding now to describe the motor and its connection with the truck, we have a motor-frame forming part of or attached to the field-magnet frame, which is journaled upon the axle, as at S S, and has projecting arms L L', furnishing bearings for the armature of the motor at J J'. The motor consists of an outer magnetic mass or frame F F, comprising top, bottom, and side pieces, which is shown as comparatively flat and shallow in order to adapt it to the position it is designed to occupy beneath the car-body. From the inner sides of the top and bottom pieces of this frame project pairs of salient poles, as seen more particularly at V V' in Figs. 5 and 6, the poles of each pair being of like polarity and facing one another. Around each pair of poles is a field-coil E, made flat and preferably of square or circular cross-section, so that when the coils are in place curved spaces or recesses are left bounded by the poles and coils, which the armature M, wound with coils in a suitable manner, substantially fills. As seen in the figure, the armature projects well into the field-coils and even through them for a short distance, as at $a\ b$. Hence the field-coils E E surround both the field-magnet poles and the armature of the motor upon somewhat the same principle as in Patent No. 233,047, granted to Elihu Thomson October 5, 1880, showing cup-shaped poles surrounded by coils, within which the armature revolves.

Upon reference to Figs. 3, 5, 6, and 7 it will be seen that the field-poles project between the field-coils and the armature in such manner as to mechanically separate them. This is an important feature, as the coils are thereby held from contact with the rotating armature even when the machine is subject to the jar incident to its use in an electric railway. This advantage is the more effectually attained by reason of the poles extending completely through the coils.

In Fig. 4, which is a plan view, the magnetizable frame is seen at F and the upper coil at E. The commutator is seen at K, and the brushes bearing upon them are carried by a yoke Y, all the details of the commutator being of any desired construction.

A motor constructed as above indicated gives maximum torque and high efficiency, although running at speeds considerably less than the motors heretofore used for street-railway service. Hence we dispense with the usual counter-shaft and one set of gears, and the pinion P' on armature W' meshes directly with a gear-wheel Q, fastened on the axle A. The gear-wheel Q is split into two parts secured together by bolts $d$. Surrounding the pinion and gear-wheel is an oil-casing D, made in halves fitted together by a gasket to prevent leakage of oil which is placed inside of the casing for the gears to run in. The motor is upheld in position by a nose-piece N, elastically supported from a transverse bar of the truck, as seen in Fig. 1, and this nose-piece is attached to or forms part of a portion of the magnetic motor-frame not actively magnetic. It can therefore be made in one piece with the motor-frame, or can be made of iron and attached thereto without causing leakage, the preferable construction, where the parts are cast, being to make it in one piece with the frame, thereby simplifying the construction mechanically.

Figure 5:
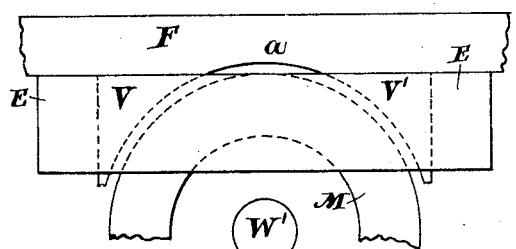
Figure 6:
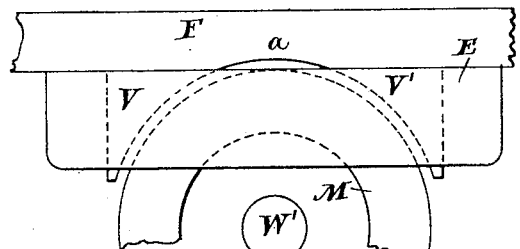
Figure 7:
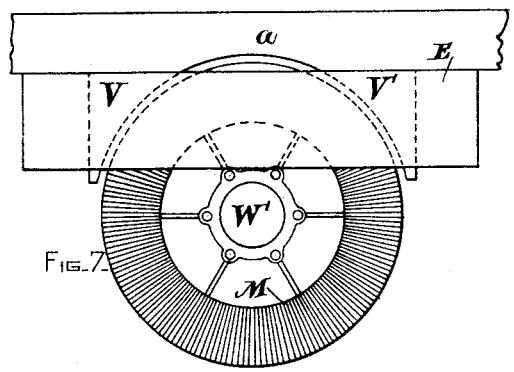

The relation between the armature and field-magnets is shown more clearly in Figs. 5, 6, and 7. Thus in Fig. 5, F is the upper portion of the field-magnet, made of iron, and V V' are the extensions which form the field-poles proper around which the coil E is wound. The armature, which may be of the ring or drum type, the former being preferred, is made to fill substantially the space between the poles V V' and coil E, so that there is a direct inductive action upon the armature itself, as well as on the poles. The polar extensions may be slightly rounded at their edges, if desired, to accommodate the field-coils.

In Fig. 7 an annular armature M is shown, and it projects slightly beyond the field-windings, whereas in Figs. 5 and 6 it does not pass entirely through. Either of these arrangements may be used, and they save a good deal of space in the construction of the motor, enabling a larger diameter of armature to be used without making the motor too tall and at the same time securing thorough magnetization by the coils of the field-magnet.

Figure 8:
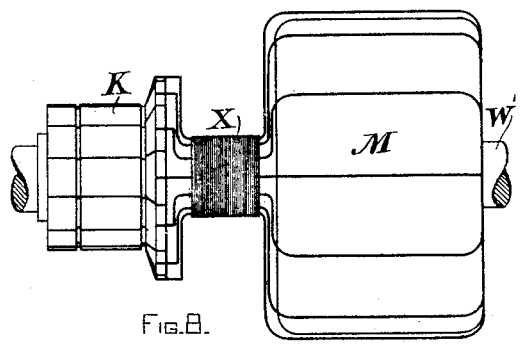
Figure 9:
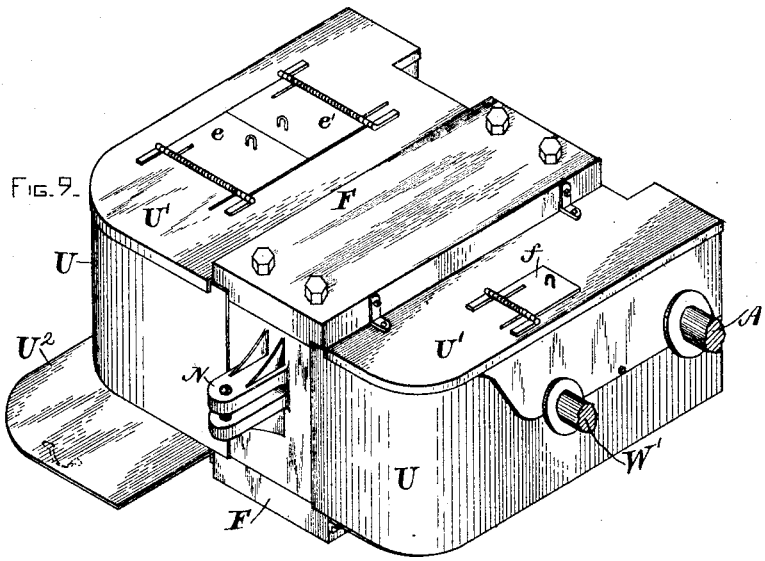

In Fig. 8 the mode of attaching the armature-wires with the commutator is shown. The body of the armature is wound with coils in the usual manner and the connections carried inward and bound closely to the shaft, as at X, when they are again carried backward and led out to the commutator-segments. This construction is adopted to enable the connections to easily clear the field-coils, which, as before explained, surround the armature and come down quite near to the armature-shaft.

A further improvement of ours is the inclosure of the motor in a dust-proof box, whereby the machine is normally protected from dust; but portions of the box can be easily removed, allowing access to the motor for inspection and necessary repairs. In fact, the box can be made of such heavy iron as to form an effective portion of the magnetic circuit of the machine, and thereby add to the efficiency of the motor proper. The box consists of two portions U U, fitting closely the sides of the magnetic frame of the motor and having top and bottom pieces U' U², so that the coils and armature are entirely inclosed. In the cover portions U' are seen small hinged spring-held doors $e$ $e'$ $f$, which permit access to the commutator and bearings. The bottom piece U², or a panel forming part of the same, slides into and out of place, as indicated at the left hand in Fig. 9, and when removed it is possible to get at the motor for inspection or repairs. The whole box is usually made in sections which can be easily taken apart and put together again.

Openings will be provided for allowing access of air for ventilating and cooling the magnet-coils.

What we claim as new, and desire to secure by Letters Patent, is—

1. An electric motor for railway-cars, comprising a field-magnet frame having journal-bearings for the axle, extensions for the armature-bearings, and interiorly-projecting poles arranged in pairs above and below the armature, field-coils surrounding the respective pairs of poles, and an armature substantially filling the space inclosed by said poles and field-coils and geared to the axles through a single reduction-gearing comprising a pinion on the armature-shaft and a gear-wheel on the axle.

2. An electric motor for railway-cars, consisting of the comparatively flat and shallow magnetizable frame having pairs of salient poles projecting inwardly from its upper and lower portions, the field-coils surrounding the poles and forming a space or recess bounded partly by both poles and coils, and an annular armature wound with coils and substantially filling said space, said armature being journaled in the frame and geared to the axle through a single reduction-pinion and spur-wheel gearing, as described.

3. An electric motor for railway-cars, having field-coils surrounding the armature and a field-magnet frame inclosing both field-coils and armature, and having polar projections extending between the coils and the armature, so as to separate them and hold the coils from contact with the armature.

4. An electric motor for railway-cars, having field-coils surrounding the armature and a field-magnet frame inclosing both field-coils and armature, and having polar projections extending between the ends of the field-coils and the periphery of the armature, so as to separate them and hold the coils from contact with the armature.

5. An electric motor for railway-cars, having field-coils surrounding the armature, so as to directly polarize the same, and a field-magnet having inwardly-projecting poles extending substantially through the coils, so as to effectually separate and support the ends of the field-coils from the cylindrical portion of the armature.

6. The combination, in an electric motor, of an outer magnetic mass or frame having pairs of salient poles projecting inwardly therefrom at opposite points, with a field-coil inclosing each pair of poles, and an armature substantially filling the space bounded by the poles and coils and projecting beyond the coils, the said poles extending between the armature and field-coils, so as to mechanically separate them.

7. The combination, in an electric motor, of an outer magnetic mass or frame having pairs of salient poles projecting inwardly therefrom at opposite points, with a field-coil surrounding each pair of poles, an armature substantially filling the space bounded by poles and coils, the commutator to one side of the field-coils, and the armature connections brought from the body of the armature in toward the shaft, so as to avoid the field-coils, and then led back and out to the commutator-segments, and means, such as a binding, for holding in the contracted portions of the said connections.

8. In combination with the railway-car-motor casing partly open on its under side, the sliding panel normally closing the open portion.

9. The railway-motor casing having an opening in its under side and a door closing said opening.

In testimony whereof we have hereto set our hands this 15th day of January, 1891.

ELIHU THOMSON.
EDWIN WILBUR RICE, JR.

Witnesses:
JOHN W. GIBBONEY,
BENJAMIN B. HULL.